United States Patent
Motomura et al.

(10) Patent No.: US 7,377,554 B2
(45) Date of Patent: May 27, 2008

(54) SEAL STRUCTURE FOR VEHICLE AIR CONDITIONER

(75) Inventors: Hirohisa Motomura, Kariya (JP); Kazuyuki Niimi, Chita (JP); Kouji Matsunaga, Kariya (JP); Masahiro Tominaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 56 days.

(21) Appl. No.: 11/104,071

(22) Filed: Apr. 12, 2005

(65) Prior Publication Data

US 2005/0230967 A1 Oct. 20, 2005

(30) Foreign Application Priority Data

Apr. 14, 2004 (JP) .............................. 2004-118894
Feb. 4, 2005 (JP) .............................. 2005-028992

(51) Int. Cl.
*F16L 27/00* (2006.01)
*F16L 41/00* (2006.01)
*B60H 1/32* (2006.01)
*B60H 1/00* (2006.01)

(52) U.S. Cl. .............................. 285/136.1; 285/137.11; 62/239; 165/41

(58) Field of Classification Search .................. 285/10, 285/207, 193, 192, 136, 137.11, 136.1; 62/239, 62/244, 404; 52/220.8; 165/41, 42, 43; 277/630, 637; 454/139
See application file for complete search history.

(56) References Cited

U.S. PATENT DOCUMENTS

| 2,193,587 | A | * | 3/1940 | Fortune et al. ............. 277/332 |
| 3,170,509 | A | * | 2/1965 | De Rees et al. ............... 165/42 |
| 3,219,103 | A | * | 11/1965 | Berry et al. ................... 165/42 |
| 3,916,639 | A | * | 11/1975 | Atkinson ...................... 62/239 |
| 4,493,497 | A | * | 1/1985 | Smith et al. ................... 285/13 |
| 5,105,592 | A | * | 4/1992 | MacMillan et al. ........... 52/232 |
| 5,555,739 | A | * | 9/1996 | Kujirai et al. ................. 62/244 |
| 5,574,254 | A | * | 11/1996 | Mori et al. .................. 174/561 |
| 5,755,107 | A | * | 5/1998 | Shirota et al. ................ 62/244 |
| 6,000,420 | A | * | 12/1999 | Nicholson et al. ....... 137/15.01 |
| 6,237,935 | B1 | * | 5/2001 | Gray et al. ............... 280/728.3 |
| 6,305,133 | B1 | * | 10/2001 | Cornwall ...................... 52/232 |
| 6,443,423 | B1 | * | 9/2002 | Smith .......................... 251/214 |
| 6,470,635 | B2 | * | 10/2002 | Cornwall .................... 52/220.8 |
| 6,629,619 | B2 | * | 10/2003 | Sato et al. .................. 220/4.02 |

(Continued)

FOREIGN PATENT DOCUMENTS

JP 2003-072360 3/2003

*Primary Examiner*—Robert J Sandy
*Assistant Examiner*—Jay R Ripley
(74) *Attorney, Agent, or Firm*—Harness, Dickey & Pierce, PLC

(57) ABSTRACT

A seal structure is provided for an air conditioning unit mounted inside a passenger compartment of a vehicle and connected with pipes, which extends to the passenger compartment from an engine cabin through a pipe penetration opening of an isolation member. The seal structure includes an annular-shape pipe coupling wall formed at a case of the air conditioning unit and arranged at an outer side of a connection unit of the pipes, a first packing unit sandwiched between the pipe coupling wall and the connection unit, and a second packing unit between the isolation member and a front end of the pipe coupling wall. The second packing unit is bonded to both the first packing unit and the pipe coupling wall.

15 Claims, 8 Drawing Sheets

U.S. PATENT DOCUMENTS

2003/0134704 A1* 7/2003 Konno et al. ............... 474/111
2003/0194896 A1* 10/2003 Fetcenko et al. ........... 439/271
2003/0230510 A1* 12/2003 Aiken et al. ................ 206/506

* cited by examiner

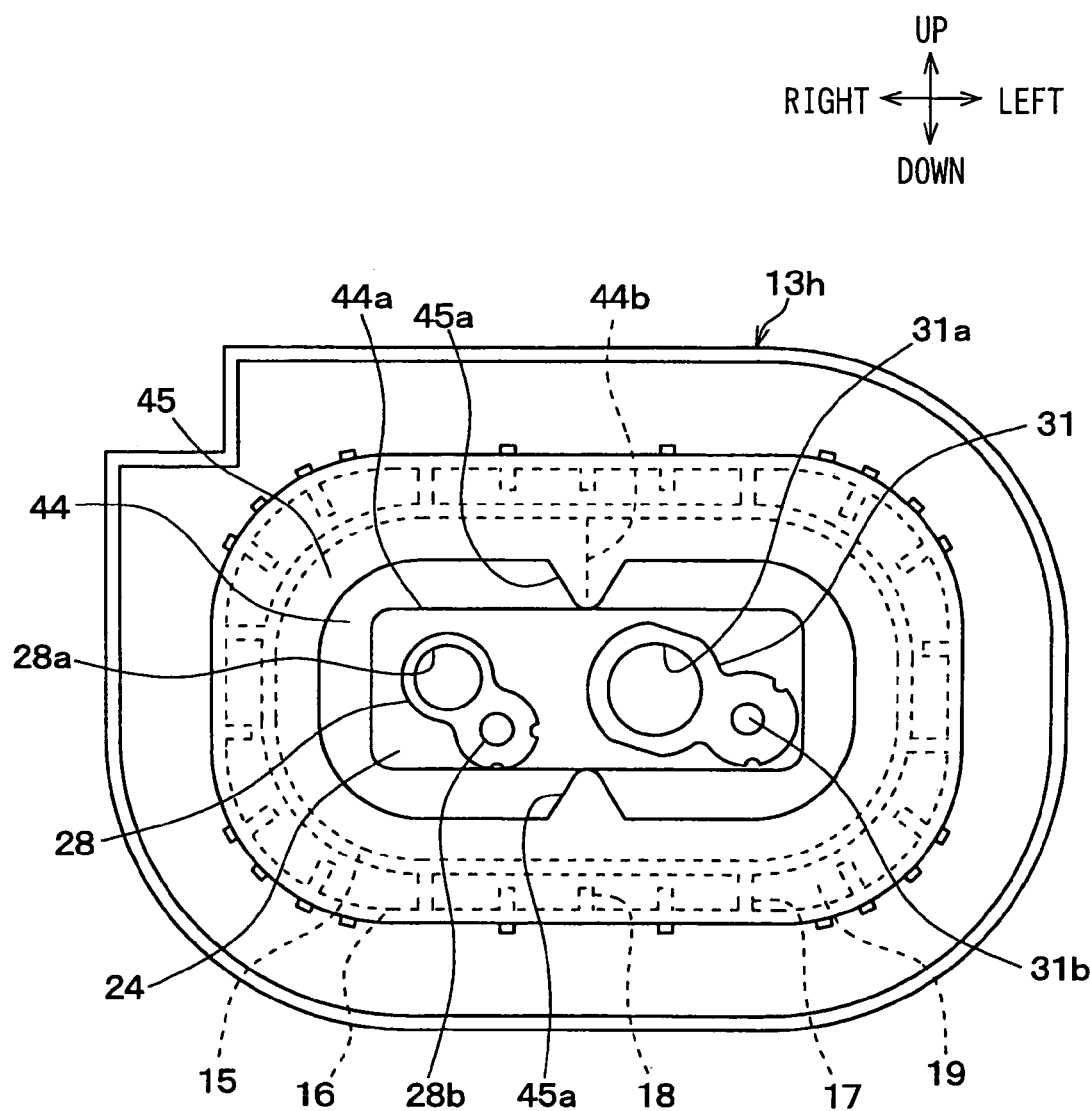

SEAL STRUCTURE FOR VEHICLE AIR CONDITIONER

CROSS REFERENCE TO RELATED APPLICATION

This application is based on Japanese Patent Applications No. 2005-28992 filed on Feb. 4, 2005 and No. 2004-118894 filed on Apr. 14, 2004.

FIELD OF THE INVENTION

The present invention relates to a seal structure for a vehicle air conditioner. The seal structure is suitably used between a case of an air conditioning unit mounted inside a passenger compartment and an isolation member, which isolates the passenger compartment from an outside area and has a pipe penetration opening.

BACKGROUND OF THE INVENTION

Generally, in an air conditioner for a vehicle, a drain pipe, refrigerant pipes and hot water pipes are arranged at the vehicle front side of an interior air conditioning unit (air conditioning unit) mounted inside a passenger compartment, to improve a mounting performance of the air conditioning unit, for example, referring to JP-2003-72360A. The refrigerant pipes are used for a refrigerant cycle through an evaporator of the air conditioning unit. Water (drain water) condensed in the evaporator is discharged out of the air conditioning unit through the drain pipe. The hot water pipes are used for a hot water cycle through a heater core of the air conditioning unit.

In the vehicle, the passenger compartment is separated from an engine cabin by an isolation member (i.e., dashboard). The isolation member is generally provided with a pipe penetration opening, through which the refrigerant pipes, the hot water pipes and the drain pipe extend to the air conditioning unit from the engine cabin (outside passenger compartment). Therefore, water (e.g., vehicle-washing water or water from road) may enter the passenger compartment from the side of the engine cabin through the pipe penetration opening. However, a seal structure for restricting water from entering the passenger compartment through the pipe penetration opening is not detailed in JP-2003-72360A.

FIG. 8 shows a seal structure described in other related art. In this case, a pipe penetration opening 43 is provided for an isolation member 40, which isolates a passenger compartment 42 from an engine cabin 41 disposed at the vehicle front side. A refrigerant pipe 30 extends into the passenger compartment 42 from the engine cabin 41 through the pipe penetration opening 43.

The interior end (inside passenger compartment 42) of the refrigerant pipe 30 is connected to one end of a refrigerant passage of an expansion valve 23 through a block joint 24 (pipe coupler). The other end of the refrigerant passage is connected to a refrigerant passage of an evaporator (not shown), which is a cooling heat exchanger in an interior air conditioning unit 10 (air conditioning unit 10).

The air conditioning unit 10 is mounted inside an instrument panel disposed at the most front portion of the passenger compartment 42. A pipe-coupling opening wall 15 (pipe coupling wall 15) is formed at the front end of a case 13h of the air conditioning unit 10. The pipe coupling wall 15 is arranged at an annular shape to have an opening facing the pipe penetration opening 43 of the isolation member 40. The block joint 24 is arranged at the inner side of the pipe coupling wall 15, which is located at the vehicle front side with respect to the expansion valve 23. The front-rear direction and the up-down direction indicated in FIG. 8 respectively correspond to the longitudinal direction and the height direction of the vehicle.

In this case, water (e.g., rain water or vehicle-washing water) may enter the passenger compartment 42 from the engine cabin 41 through the pipe penetration opening 43, as indicated by the arrow 'a' in FIG. 8.

The seal structure for preventing water from leaking into the passenger compartment 42 is constructed of a first, second and third packing units 51, 52, 53, all of which have an annular shape. The first and second packing unit 51, 52 are wrapped around the block joint 24, while the second packing unit 52 is disposed at the vehicle front side of the first packing unit 51. The rear end surface (bond portion 52a) of the second packing unit 52 is bonded to the front end surface of the first packing unit 51. The whole inner surface (bond portion 51a) of the first packing unit 51 is bonded to the outer surface (metal surface) of the block joint 24.

An outer wall 16 is further formed at the front end of the case 13h. The outer wall 16 is arranged at the outer side of the pipe coupling wall 15 and separated from it at a predetermined distance.

The third annular-shape packing unit 53 is located between the isolation member 40 and the front ends of the walls 15, 16, and arranged along the rim portion of the pipe penetration opening 43. The rear end surface of the third packing unit 53 is bonded to the front end surface of the walls 15, 16 to construct bond portions 53a, 53b.

In this case, the walls 15 and 16 are arranged at a double-ring shape to form a space 19 therebetween. Thus, the whole case 13h (made of resin, for example) including the two walls 15 and 16 can be formed to have a homogeneous thickness, to prevent a resin formation defect generated in a large-thickness part.

However, the seal structure including the first, second and third packing units 51-53 cannot effectively restrict water from entering the passenger compartment 42, as described in following.

According to this related art, the third packing unit 53 is only bonded to the front end surfaces of the walls 15 and 16 which are arranged at the double-ring shape, to have a small bond area. Therefore, a gap between the third packing unit 53 and the walls 15 and 16 is easily generated due to a faulty bond therebetween. Then, water which enters the rear side of the third packing unit 53 as indicated by the arrow 'a' may leak into the passenger compartment 42 through the gap as indicated by the arrow 'b'.

Moreover, the second packing unit 52 is only bonded to the front end surface of the first packing unit 51. When water enters the case 13h at a high speed (as indicated by arrow 'a'), for example, in a vehicle high-speed traveling or a washing of the vehicle, the inner surface of the second packing unit 52 will curl up due to a high-speed inflow of water so that water enters the inner side of the second packing unit 52.

Water entering the inner side of the second packing unit 52 will accumulate at the lower side of the inner surface of the pipe coupling wall 15 due to the self weight, to directly contact the first packing unit 51. In this case, the first packing unit 51 is originally set not to directly contact water, and made of a cheaper material (e.g., polyether urethan foam) having a lower watertightness capacity, as compared with that of the second packing unit 52. Then, water will enter the case 13h through a minute gap between the outer surface of the first packing unit 51 and the inner surface of the pipe coupling wall 15, as indicated by the arrow 'c'.

Water entering the case 13h will be discharged out of the passenger compartment 42 through a drain-water outlet (not shown) mounted at the bottom portion of the case 13h. Because the case 13h (made of resin) is generally divided into two parts in the vehicle left-right direction by a division member, water having entered the case 13h may be leaked into the passenger compartment 42 along the division member and flow into a driving motor of a blower to cause a failure of the driving motor.

Furthermore, in this case, the first packing unit 51 is only fixed between the block joint 24 and the pipe coupling wall 15, without being supported by the case 13h. That is, the rear end surface of the first packing unit 51 directly faces a space 54.

Then, the first packing unit 51 pushed by water in the direction indicated as the arrow 'a' will move to the vehicle rear side. As a result, the minute gap between the outer surface of the first packing unit 51 and the inner surface of the pipe coupling wall 15 is enlarged. Therefore, water entering the case 13h is further increased.

SUMMARY OF THE INVENTION

In view of the above-described disadvantages, it is an object of the present invention to provide a seal structure for a vehicle air conditioner, so as to restrict water from entering both a case of an air conditioning unit mounted inside a passenger compartment and the passenger compartment through a pipe penetration opening of an isolation member, which isolates the passenger compartment from an outside area such as an engine cabin.

According to the present invention, a seal structure is provided for a vehicle air conditioner having an air conditioning unit (interior air conditioning unit) mounted inside a passenger compartment. The air conditioning unit is connected with pipes, which extend into the passenger compartment from an outside area through a pipe penetration opening of an isolation member. The seal structure includes a pipe-coupling opening wall formed at a case (air conditioning case) of the air conditioning unit and mounted at an outer side of a connection unit of the pipes, a first packing unit disposed between an inner surface of the pipe-coupling opening wall and an outer surface of the connection unit, and a second packing unit arranged between the isolation member and an end of the pipe-coupling opening wall of the side of the isolation member. The pipe-coupling opening wall is arranged at an annular shape. The second packing unit is bonded to both the first packing unit and the pipe-coupling opening wall. Thus, the bond area of the second packing unit is increased.

Then, the second packing unit can be bonded more substantially. Accordingly, water can be effectively restricted from entering the passenger compartment, even if a gap is generated between the second packing unit and the end of the pipe-coupling opening wall due to a faulty bond therebetween.

Preferably, the seal structure further includes a step wall formed at the air conditioning case. The step wall is disposed at an opposite end of the pipe-coupling opening wall with respect to the isolation member, and protrudes from the inner surface of the pipe-coupling opening wall to an inner side thereof. The first packing unit is supported by the step wall, and has an inner surface bonded to the outer surface of the connection unit.

Accordingly, a deformation or a movement (due to push of water) of the first packing unit to an opposite side of the isolation member can be restricted by the step wall, thus preventing a stripping (due to deformation or movement) of the bond portion between the inner surface of the first packing unit and the outer surface of the connection unit. Therefore, a gap can be prevented from generating between the first packing unit and the connection unit, so that water is restricted from entering the inner side of the air conditioning case through the bond portion.

More preferably, the step wall is provided with a rib, which is arranged at least at the lower side thereof to push the first packing unit against the second packing unit, and push the second packing unit against the isolation member through the first packing unit.

Accordingly, the bearing stress between the second packing unit and the isolation member and that between the first and second packing units are increased at the position corresponding to that of the rib. Thus, water can be effectively restricted from entering the passenger compartment and the inner side of the air conditioning case.

BRIEF DESCRIPTION OF THE DRAWINGS

Other objects, features and advantages of the present invention will become more apparent from the following detailed description made with reference to the accompanying drawings, in which:

FIG. 6 is a front view showing an arrangement of packing units according to a third embodiment of the present invention and corresponding to a front view viewed in an arrow direction II in FIG. 1;

DETAILED DESCRIPTION OF THE PREFERRED EMBODIMENTS

First Embodiment

A first embodiment of the present invention will be described with reference to FIGS. 1-4. A seal structure according to this embodiment is provided for an interior air conditioning unit 10 (air conditioning unit 10) of an air conditioner for a vehicle. The air conditioning unit 10 is mounted inside an instrument panel (not shown) located at a front portion of a passenger compartment. The front-rear direction, the left-right direction and the up-down direction indicated in FIGS. 1-4 respectively correspond to the longitudinal direction, the width direction and the height direction of the vehicle.

Figure 1:
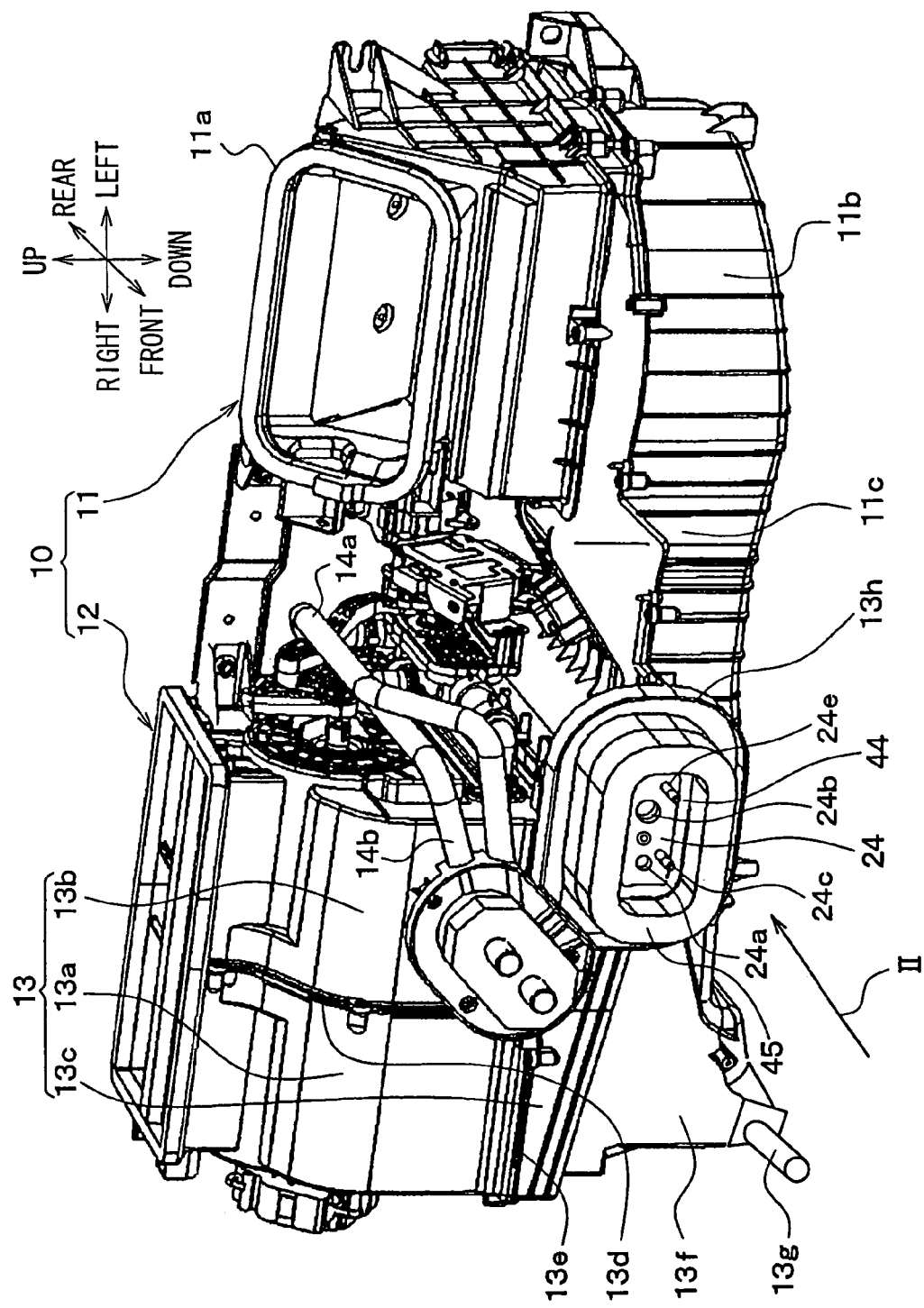
FIG. 1 is a perspective view showing an interior air conditioning unit of a vehicle air conditioner according to a first embodiment of the present invention.

As shown in FIG. 1, the air conditioning unit 10 is provided with a blower member 11 and an air conditioning body member 12. The blower member 11 includes an inner/outer air switching box 11a located at the upper portion thereof and a blower 11b arranged at the lower side of the inner/outer air switch box 11a. The inner/outer air switching box 11a is used to switch an introduction between inside air and outside air. The blower 11b is a centrifugal blow fan driven by an electrical motor. The centrifugal blow fan has a blow outlet 11c connected to an air inlet portion (not shown) of the air conditioning body member 12.

The air conditioning body member 12 has a case 13 (air conditioning case 13) made of, for example, a resin. The air conditioning case 13 is divided into three parts, that is, a right case 13a at the right portion of the air conditioning case 13, a left case 13b at the vehicle left side with respect to the right case 13a, and a lower case 13c at the lower side of the right and left cases 13a, 13b.

The right, left and lower cases 13a, 13b and 13c are integrated with each other through fastening units such as screws or metal spring clicks to construct the air conditioning case 13. The right case 13a is separated from the left case 13b by a first division portion 13d. The right and left cases 13a, 13b are separated from the lower case 13c by a second division portion 13e.

The lower case 13c is provided with the above-described air inlet portion, through which blow air from the blower 11b is introduced into the air conditioning body member 12. An evaporator (not shown), being a cooling heat exchanger, is disposed at an air upstream side in an air passage defined by the air conditioning case 13. In the evaporator, low-pressure refrigerant of a refrigerant cycle absorbs heat from air to be evaporated, so that air is cooled.

A heater core (not shown), being a heating heat exchanger, is arranged at the air downstream side of the evaporator. The heater core is connected with hot water pipes 14a, 14b, so that hot water (engine cooling water) is circulated through the heater core to heat air as a heat source.

The temperature of air to be blown into the passenger compartment 42 is adjusted by temperature control units (not shown) such as an air mixing door, a hot-water flow amount adjusting valve and the like, which are provided for the air conditioning body member 12. Air having a conditioned temperature will be blown into the passenger compartment 42 through an air blowing-out port switching unit.

The lower case 13c has a condensed-water reception portion 13f, which is located at the lower side of the evaporator to receive water (drain water) condensed in the evaporator. A drain pipe 13g is integrated with the condensed-water reception portion 13f, and protrudes from the most low side thereof toward the vehicle front side.

A pipe connecter accommodation case 13h (accommodation case 13h) is integrated with the lower case 13c at the side of the blower member 11, that is, at the left portion of the lower case 13c, to accommodate a connection part of refrigerant passages communicated with the evaporator.

Next, the construction and the seal structure of the connection part of the refrigerant passages are described.

Figure 2:
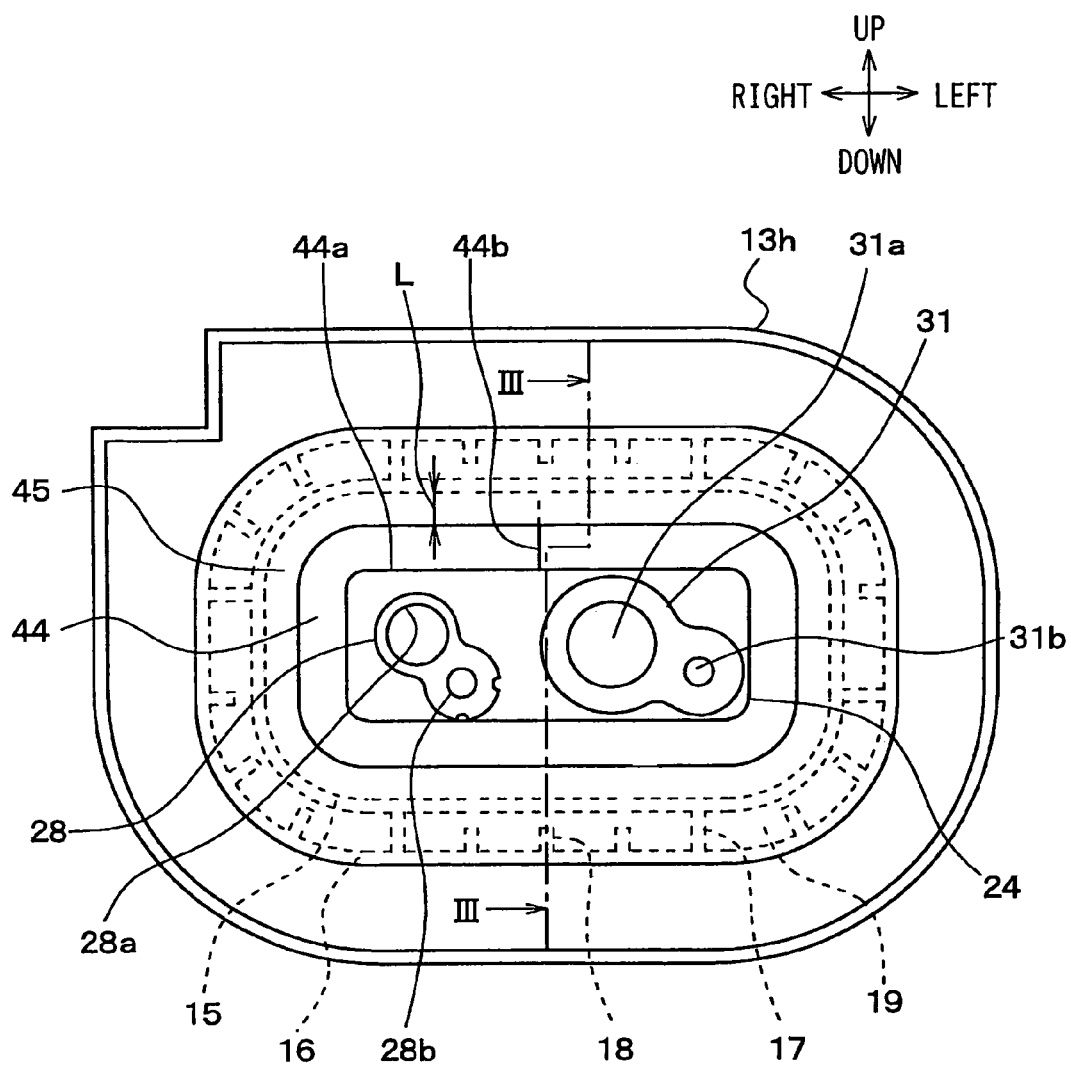
FIG. 2 is a partial front view of the interior air conditioning unit viewed in an arrow direction II in FIG. 1.

As shown in FIG. 2, the accommodation case 13h has a periphery wall, which is arranged at an approximate ellipse-ring shape with a major diameter in the substantial left-right direction of the vehicle to form an opening facing the vehicle front side.

The accommodation case 13h is integrated with a pipe-coupling opening wall 15 (pipe coupling wall 15) and an outer wall 16, each of which is arranged at an approximate ellipse-ring shape with a major diameter in the substantial left-right direction of the vehicle to form an opening facing the vehicle front side.

The walls 15 and 16 are disposed at the substantially radially middle part of the inner portion of the periphery wall of the accommodation case 13h, and arranged at a double-ring shape. The outer wall 16 is dispose at the outer side of the pipe coupling wall 15 and separated from it at a predetermined diametrical distance.

In this case, the accommodation case 13h is provided with the two walls 15, 16 forming a space 19 therebetween, so that the whole accommodation case 13h (lower case 13c) can be constructed to have an approximately homogeneous thickness.

Multiple ribs 17, being arranged in the space 19, protrude from the inner surface of the outer wall 16 at different circumferential positions thereof, and are integrated with the inner surface of the pipe coupling wall 15. Moreover, the outer wall 16 is integrated with multiple ribs 18, which are arranged in the space 19 at different circumferential positions of the outer wall 16. The ribs 18 protrude from the inner surface of the outer wall 16 toward the pipe coupling wall 15, without contacting it.

Figure 3:
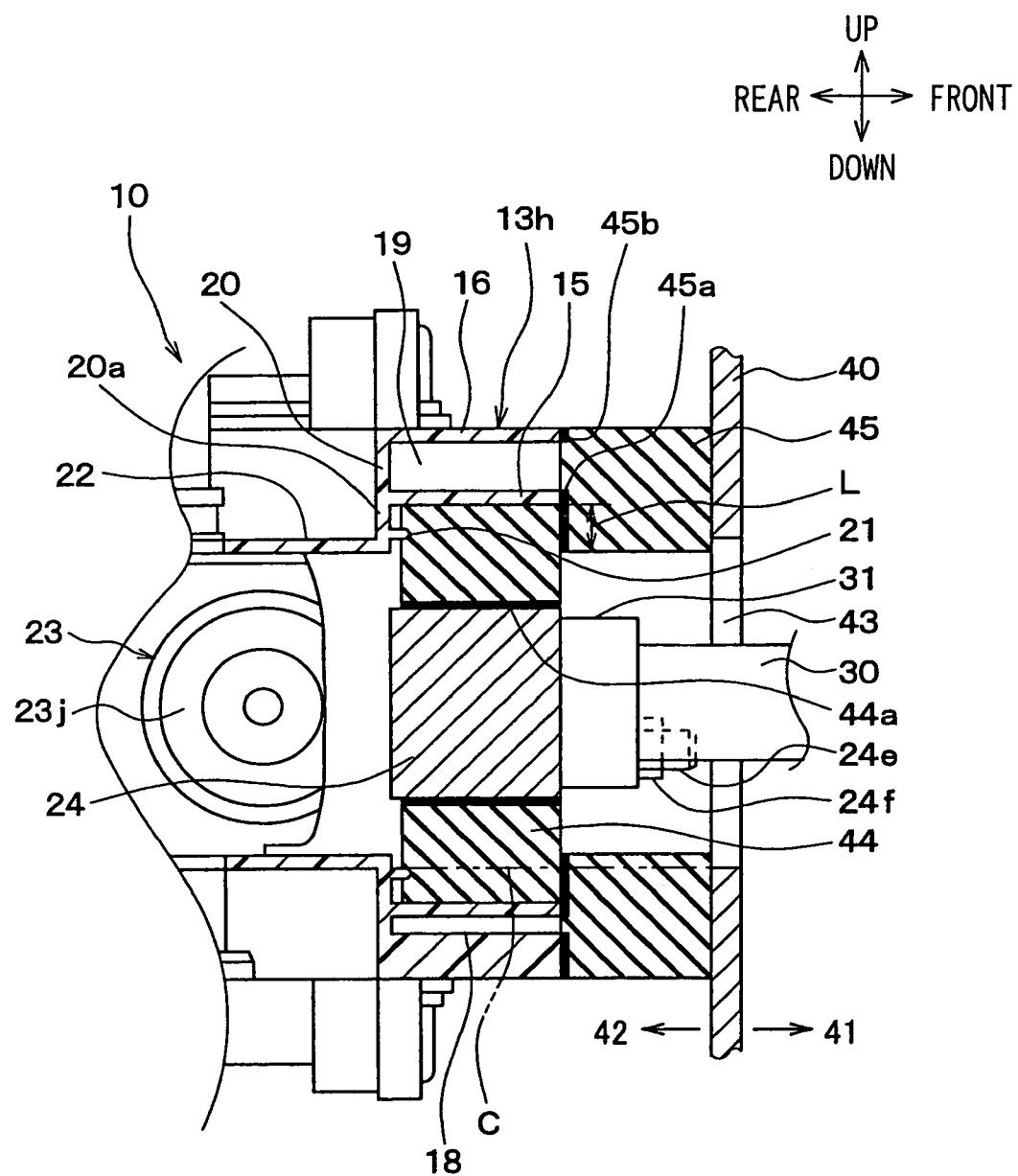
FIG. 3 is a cross-sectional view taken along a line III-III in FIG. 2.

Referring to FIG. 3, a wall 20, extending in the vehicle up-down direction, is integrally connected with the rear ends of the walls 15 and 16. According to this embodiment, the wall 20 is integrated with a step portion 20a (step wall) disposed at the rear end of the pipe coupling wall 15. The step portion 20a protrudes from the inner surface of the pipe coupling wall 15 to the inner side along the whole circumference thereof, to have a substantial ellipse-ring shape.

The step portion 20a is provided with a rib 21, which protrudes from the step portion 20a toward the vehicle front side. The rib 21 is arranged at the whole step portion 20a in the circumference direction thereof, to have a substantial ellipse-ring shape with a major diameter in the approximate left-right direction of the vehicle. The rib 21 tapers to have an approximate triangle-shape tip in a cross section parallel to the central axis thereof.

The inner rim of the step portion 20a is integrally connected with a box portion 22, which extends toward the vehicle rear side. The box portion 22 has, for example, an approximately rectangular parallelepiped shape with a longitudinal direction corresponding to the vehicle left-right direction, to accommodate a box-type expansion valve 23 therein. Then, a block joint 24 (coupler for refrigerant pipes) attached to the expansion valve 23 is accommodated at the inner side of the pipe coupling wall 15.

Figure 4:
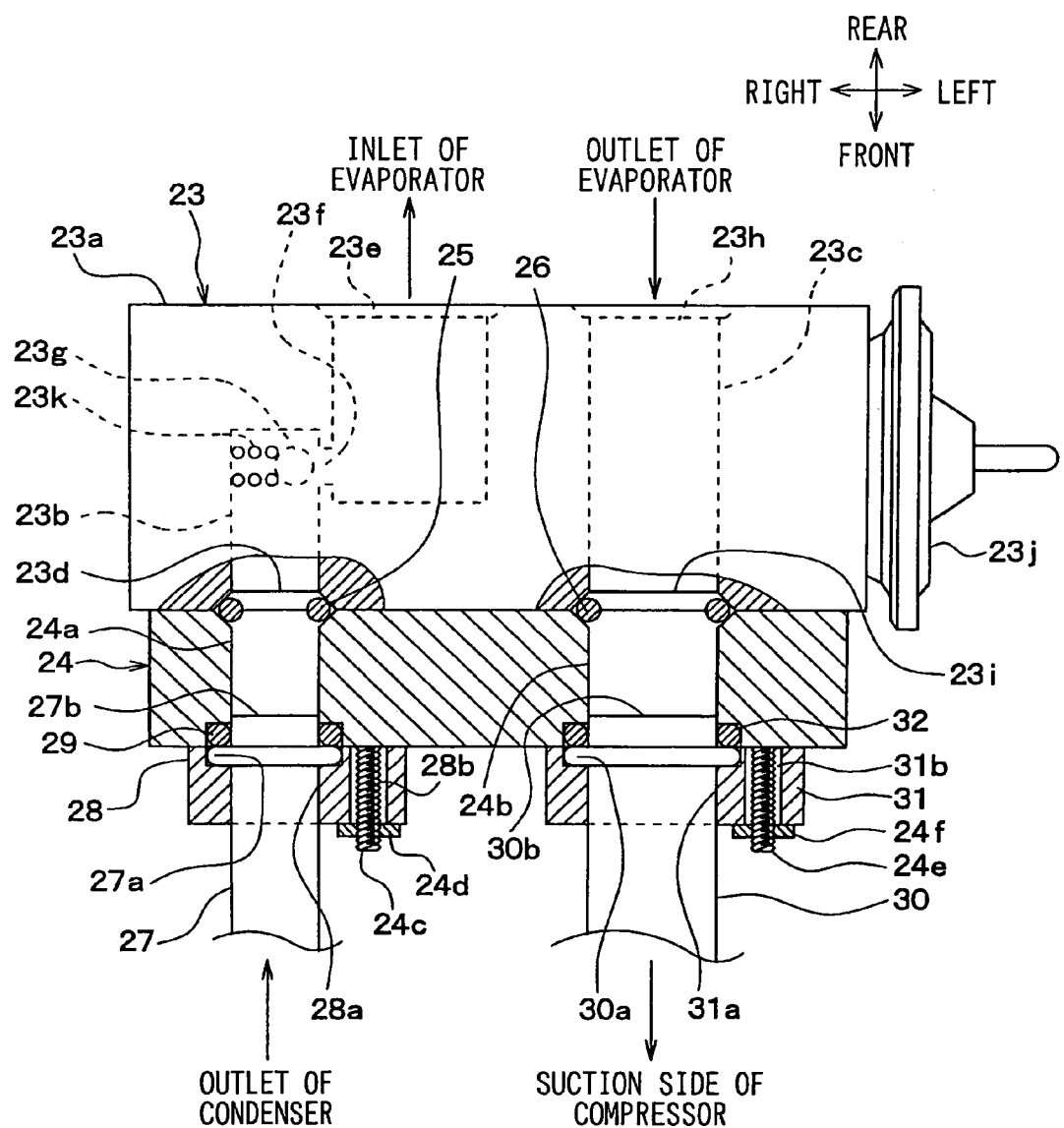
FIG. 4 is a plan view showing a connection part between refrigerant pipes and an expansion valve according to the first embodiment.

As shown in FIG. 4, the expansion valve 23 has a housing member 23a, which is made of a medal such as aluminum and has an approximately rectangular parallelepiped shape with a longitudinal direction corresponding to the vehicle left-right direction. A first refrigerant passage 23b and a second refrigerant passage 23c are formed in the housing member 23a, and arranged in parallel with respect to the vehicle front-rear direction.

The first refrigerant passage 23b has an evaporator connection portion 23e, which is disposed at one end of the first refrigerant passage 23b and open at the outer surface of the housing member 23a. The refrigerant inlet side of the evaporator is connected to the first refrigerant passage 23b at the evaporator connection portion 23e. The other end of the first refrigerant passage 23b has a pipe connection portion 23d, which is open at the outer surface of the housing member 23a at the opposite side of the evaporator connection portion 23e. The discharge side of a condenser (not shown) is connected to the first refrigerant passage 23b at the pipe connection portion 23d.

The first refrigerant passage 23b is provided with a throttle passage 23f at the halfway part thereof. The opening degree of the throttle passage 23f is adjusted by a ball-shape valve body 23g. High-pressure liquid refrigerant, which flows into the first refrigerant passage 23b from the discharge side of the condenser through the pipe connection portion 23d, will be decompressed in the throttle passage 23f to become gas-liquid diphase with a low pressure and a low temperature.

The second refrigerant passage 23c has an evaporator connection portion 23h, which is disposed at one end of the second refrigerant passage 23c and open at the outer surface of the housing member 23a. The refrigerant outlet side of the evaporator is connected to the second refrigerant passage 23c at the evaporator connection portion 23h. The other end of the second refrigerant passage 23c has a pipe connection portion 23i, which is open at the outer surface of the housing member 23a at the opposite side of the evaporator connection portion 23h. The suction side of a compressor (not shown) is connected to the second refrigerant passage 23c at the pipe connection portion 23i.

The evaporator connection portions 23e and 23h are open at the same side of the outer surface of the housing member 23a. The pipe connection portions 23d and 23i are open at the same side of the outer surface of the housing member 23a. The housing member 23a is arranged inside the box portion 22, so that the pipe connection portions 23d, 23i are disposed at the vehicle front side with respect to the evaporator connection portions 23e, 23h.

The expansion valve 23 is provided with a diaphragm unit 23j (valve body operation unit) outside the housing member 23a. The diaphragm unit 23j adjusts an operation stroke (opening degree) of the valve body 23g, responding to a overheat degree of refrigerant which flows through the second refrigerant passage 23c from the outlet of the evaporator.

The diaphragm unit 23j has first and second pressure cabins (temperature detection cabins), which are not shown. The pressure of the first pressure cabin is changed responding to the temperature of refrigerant at the outlet of the evaporator. The pressure of the second pressure cabin is changed responding to the temperature of refrigerant at the second refrigerant passage 23c. Here, the temperature of refrigerant is detected by a temperature detection unit (not shown).

The diaphragm unit 23j is provided with a built-in diaphragm, at which a spring force of a spring 23k and a pressure difference between the first and second pressure cabins are exerted. Thus, the diaphragm will have a displacement responding to the overheat degree of refrigerant of the outlet side of the evaporator, so that the valve body 23g is displaced to adjust the opening degree of the throttle passage 23f.

The block joint 24 is integrally fastened on the outer surface of the housing member 23a through fastening units such as screws (not shown), and disposed at the side of the pipe connection portions 23d, 23i. The block joint 24 is made of a metal such as aluminum, and has an approximately rectangular parallelepiped shape with a longitudinal direction corresponding to that of the housing member 23a, that is, in the vehicle right-left direction.

A high-pressure refrigerant passage 24a and a low-pressure refrigerant passage 24b are formed in the block joint 24A, and arranged in parallel with respect to the vehicle front-rear direction to respectively correspond to the positions of the first refrigerant passage 23b and the second refrigerant passage 23c.

The rear ends of the high-pressure and low-pressure refrigerant passages 24a, 24b are respectively connected with the pipe connection portions 23d and 23a of the first and second refrigerant passages 23b, 23c. An O-ring-like seal unit 25 (made of resilient material) is arranged between the pipe connection portion 23d and the rear end of the high-pressure refrigerant passage 24a. Similarly, an O-ring-like seal unit 26 (made of resilient material) is arranged between the pipe connection portion 23i and the rear end of the low-pressure refrigerant passage 24b. Here, the connection part between the refrigerant passages can be substantially sealed.

On the other hand, the front ends (diameter-enlarged hole portions) of the high-pressure and low-pressure refrigerant passages 24a, 24b are respectively engaged with an outlet end 27b of a high-pressure refrigerant pipe 27 and an inlet end 30b of a low-pressure refrigerant pipe 30. An inlet end (not shown) of the high-pressure refrigerant pipe 27 and an outlet end (not shown) of the low-pressure refrigerant pipe 30 are respectively connected to the outlet side of the condenser and the suction side of the compressor.

The high-pressure refrigerant pipe 27 is mounted at the front outer surface of the block joints 24 through a potbellied-shape flange member 28 made of a medal, for example. The flange member 28 is provided with an engagement hole 28a and an attachment hole 28b (referring to FIG. 2), which penetrate the flange member 28. The engagement hole 28a has a diameter-enlarged hole portion formed at the end thereof of the side of the block joints 24.

The high-pressure refrigerant pipe 27 has a diameter-enlarged portion 27a disposed at the immediate front side of the outlet end 27b thereof. The outlet portion of the high-pressure refrigerant pipe 27 is inserted through the engagement hole 28a, so that the outlet end 27b is inserted into the front end of the high-pressure refrigerant passage 24a. In this case, the diameter-enlarged portion 27a is accommodated in the diameter-enlarged hole portion of the engagement hole 28a.

As described above, the outlet end 27b of the high-pressure refrigerant pipe 27 is inserted into the diameter-enlarged hole portion (front end) of the high-pressure refrigerant passage 24a. In this case, an O-ring-like seal unit 29 (made of resilient material) is arranged around the outlet end 27b, and accommodated in the diameter-enlarged hole portion.

The flange member 28 is attached to the block joint 24 through a female screw 24c, which is inserted into the attachment hole 28b of the flange member 28. One end of the female screw 24c is fixed to the block joint 24, and the other end thereof is engaged with a nut 24d to be fastened. Thus, the flange member 28 is integrally fixed to the block joint 24.

Then, the diameter-enlarged portion 27a and the seal unit 29 are pushed against the block joint 24 (inner wall of diameter-enlarged hole portion) by the flange member 28. Accordingly, the outlet end 27b of the high-pressure refrigerant pipe 27 is substantially connected with the high-pressure refrigerant passage 24a of the block joint 24. Here, the seal unit 29 is compressed to have a resilient deformation, to seal the connection part of the refrigerant passages.

Similarly to the high-pressure refrigerant pipe 27, the inlet end 30b of the low-pressure refrigerant pipe 30 is inserted into the diameter-enlarged hole portion (front end) of the low-pressure refrigerant passages 24b. The low-pressure refrigerant pipe 30 is provided with a diameter-enlarged portion 30a at the immediate front side of the outlet end 30b. An O-ring-like resilient seal unit 32 is arranged around the inlet end 30b of the low-pressure refrigerant pipe 30, and accommodated in the diameter-enlarged hole portion of the low-pressure refrigerant passages 24b.

The low-pressure refrigerant pipe 30 is mounted at the front outer surface of the block joints 24 through a potbellied-shape flange member 31 made of a medal, for example. The flange member 31 is provided with an engagement hole 31a and an attachment hole 31b (referring to FIG. 2), which penetrate the flange member 31. The engagement hole 31a has a diameter-enlarged hole portion formed at the end thereof of the side of the block joints 24.

The flange member 31 is attached to the block joint 24 through a female screw 24e, which is inserted into the attachment hole 31b. One end of the female screw 24e is fixed to the block joint 24, and the other end thereof is engaged with a nut 24f to be fastened. Thus, the flange member 31 is integrally fixed to the block joint 24.

Then, the diameter-enlarged portion 30a of the low-pressure refrigerant pipe 30 and the resilient seal unit 32 are pushed against the block joint 24. Therefore, the low-pressure refrigerant pipe 30 is hermetically connected with the low-pressure refrigerant passage 24b.

Next, the seal structure between the connection part of the refrigerant passages and the air conditioning case 13, and that between the connection part of the refrigerant passages and the side of an engine cabin 41 are described.

As shown in FIG. 3, the air conditioning unit 10 is arranged inside the instrument panel disposed at the most front portion of the passenger compartment 42, and located immediately behind an isolation member 40 (i.e., dashboard), which separates the passenger compartment 42 from the engine cabin 41 located at the vehicle front side.

The isolation member 40 is provided with a pipe penetration opening 43 facing the opening formed by the pipe coupling wall 15. The pipe penetration opening 43 has an ellipse shape with a longitudinal direction corresponding to the vehicle right-left direction. The opening area of the pipe penetration opening 43 is set smaller than that of the pipe coupling wall 15.

The block joint 24 is accommodated at the inner side of the pipe coupling wall 15, while a first packing unit 44 is arranged therebetween as a seal unit. The first packing unit 44 is constructed of a band-shape packing material (resilient material), which is wrapped around the block joint 24 while being bonded to the outer surface thereof. That is, the inner surface of the first packing unit 44 is bonded to the whole outer surface of the block joint 24 to construct a bond portion 44a therebetween. Thus, the first packing unit 44 is fixed to the block joint 24 to have an approximate rectangle-ring shape.

Referring to FIG. 2, the two ends of the band-shape packing material constructing the first packing unit 44 butt against each other to construct a butt portion 44b, which is arranged on the upper-side outer surface of the block joint 24 and located at the left-right direction middle part of the upper-side outer surface.

With reference to FIG. 3, the front-rear direction dimension of the first packing unit 44 is set substantially equal to that of the block joint 24. In this case, the front end surface of the first packing unit 44 is arranged at the same plane with the front end surfaces of the walls 15, 16.

The diametrical thickness of the first packing unit 44 is set so that the first packing unit 44 has a clearance fit to the pipe coupling wall 15. The clearance fit means that the outer diameter of the first packing unit 44 is equal to or little smaller than the inner diameter of the pipe coupling wall 15. Thus, the first packing unit 44 can be readily mounted at the inner side of the pipe coupling wall 15 along with the block joint 24.

Furthermore, the rear end (at side of expansion valve 23) of the first packing unit 44 is supported by the step portion 20a of the wall 20, which is integrated with the rear ends of the walls 15 and 16. Because the rib 21 having the ellipse-ring shape protrudes from the step portion 20a toward the vehicle front side, the tip portion of the rib 21 will be pushed against the rear end surface of the first packing unit 44.

A second packing unit 45 is disposed between the pipe penetration opening 43 of the isolation member 40 and the front ends of the walls 15, 16 of the accommodation case 13h. The second packing unit 45 has a substantial ellipse-ring shape and is arranged along the rim portion of the pipe penetration opening 43, referring to FIG. 1. The second packing unit 45a is formed by a stamping of a sheet-shape packing material.

According to this embodiment, the second packing unit 45 is overlapped with the first packing unit 44 in the vehicle front-rear direction to construct a ring-shape contact portion therebetween, which is defined between the inner rim of the pipe coupling wall 15 (outer rim of first packing unit 44) and the inner rim of the second packing unit 45. The contact portion has a diametrical width L indicated in FIGS. 2 and 3. The rear end surface of the second packing unit 45 is fixedly bonded to both the front end surface of the first packing unit 44 and those of the walls 15, 16.

Specifically, the rear end of the second packing unit 45 contacts the front ends of the pipe coupling wall 15 and the first packing unit 44, to construct a contact portion 45a therebetween indicated by a thick line in FIG. 3. Moreover, the rear end of the second packing unit 45 contacts the front end of the outer wall 16, to construct a contact portion 45b therebetween indicted by a thick line in FIG. 3.

As described above, the multiple ribs 17 and the multiple ribs 18 are arranged between the walls 15 and 16. The ribs 17 are integrated with the walls 15 and 16. The ribs 18 protrude from the outer wall 16 to the side of the pipe coupling wall 15. The front end surfaces of the ribs 17 and 18 are also bonded to the rear end surface of the second packing unit 45.

In this case, the second packing unit 45 is inserted between the isolation member 40 and the walls 15, 16, to be compressed in the vehicle front-rear direction to have a resilient deformation. Thus, the second packing unit 45 is pushed against the isolation member 40 due to a reaction of the resilient deformation.

According to this embodiment, the ring-shape rib 21 protruding from the step portion 20a is arranged at the position corresponding to that of the rim portion of the pipe penetration opening 43 with respect to the vehicle front-rear direction, as indicated by a two-point chain line C in FIG. 3. Thus, the rib 21 pushes the second packing unit 45 against the isolation member 40 through the first packing unit 44. Therefore, the bearing stress is partially increased at the contact portion between the rib 21 and the first packing unit 44, and the contact portion which is between the second packing unit 45 and the isolation member 40 and corresponding to the position of the rib 21.

Next, the materials of the first and second packing units 44, 45 are described.

The first packing unit 44 is made of a seal material (resilient material) having a significantly higher watertightness capacity than that of the second packing unit 45. The second packing unit 45 is made of a seal material (resilient material) having a significantly higher resilience capacity than that of the first packing unit 44.

Specifically, the material of the first packing unit 44 has a low resilience capacity and a high watertightness capacity, for example, a polyethylene foam. In contrast, the material of the second packing unit 45 has a high resilience capacity and a low watertightness capacity, for example, a polyether urethan foam.

In this case, the watertightness capacity of the seal material is a capacity for preventing water at the surface thereof from permeating the seal material. With an increase of the density of the seal material, the watertightness capacity thereof tends to increase while the resilience capacity tends to decrease.

Next, the mounting of the air conditioning unit 10 in the vehicle is described.

The air conditioning unit 10 is mounted at a predetermined position inside the passenger compartment 42 (i.e., at vehicle rear side of isolation member 40) and supported by the isolation member 40, the instrument panel and the like. That is, all of the expansion valve 23, the block joint 24 and the first, second packing units 44, 45 are mounted at the vehicle rear side of the isolation member 40.

According to the first embodiment, the first packing unit 44 is made of the seal material having the low resilience capacity and the high watertightness capacity, thus having a small resilient deformation in the mounting. Because the outer surface of the first packing unit 44 is set to have the clearance fit with the inner surface of the pipe coupling wall 15, the first packing unit 44 engaged with the block joint 24 can be readily inserted into the pipe coupling wall 15 even if the first packing unit 44 has the low resilience capacity.

The second packing unit 45 is mounted between the isolation member 40 and the front ends of the walls 15, 16 to be compressed in the vehicle front-rear direction, thus having a resilient deformation. Therefore, the front end surface of the second packing unit 45 is pushed against the isolation member 40.

Generally, the mounting position of the air conditioning unit 10 in the vehicle may deviate from the predetermined position, due to variations in component dimensions thereof. According to this embodiment, the second packing unit 45 is made of the material having the high resilience capacity, thus being capable of offsetting the deviation from the predetermined position through a resilient deformation. Accordingly, the air conditioning unit 10 can be readily mounted in the vehicle.

When the mounting of the air conditioning unit 10 in the vehicle is finished, the front end (front end surface) of the block joint 24 is exposed to the engine cabin 41 through the pipe penetration opening 43. Therefore, the engagement and disengagement of the nuts 24d, 24f with the female screws 24c and 24e of the block joint 24 can be operated at the side of the engine cabin 41.

Therefore, both the connection of the high-pressure refrigerant pipe 27 with the high-pressure refrigerant passage 24a through the flange member 28, and that of the low-pressure refrigerant pipe 30 with the low-pressure refrigerant passage 24b through the flange member 31 can be operated at the side of the engine cabin 41.

Similarly, in the case where the refrigerant pipes 27, 30 need to be detached for a repair or the like, the nuts 24d and 24f can be disengaged from the side of the engine cabin 41 while the air conditioning unit 10 keeps in the mounting in the vehicle.

Next, the effects of the seal structure of the air conditioning unit 10 are described.

According to the first embodiment, the second packing unit 45 is arranged at the vehicle front side of the first packing unit 44, and overlapped with the first packing unit 44 in the vehicle front-rear direction at the contact portion with the width L. Therefore, the rear end surface of the second packing unit 45 is fixedly bonded to not only the front end surfaces of the walls 15 and 16, but also the front end surface of the first packing unit 44.

Figure 8:
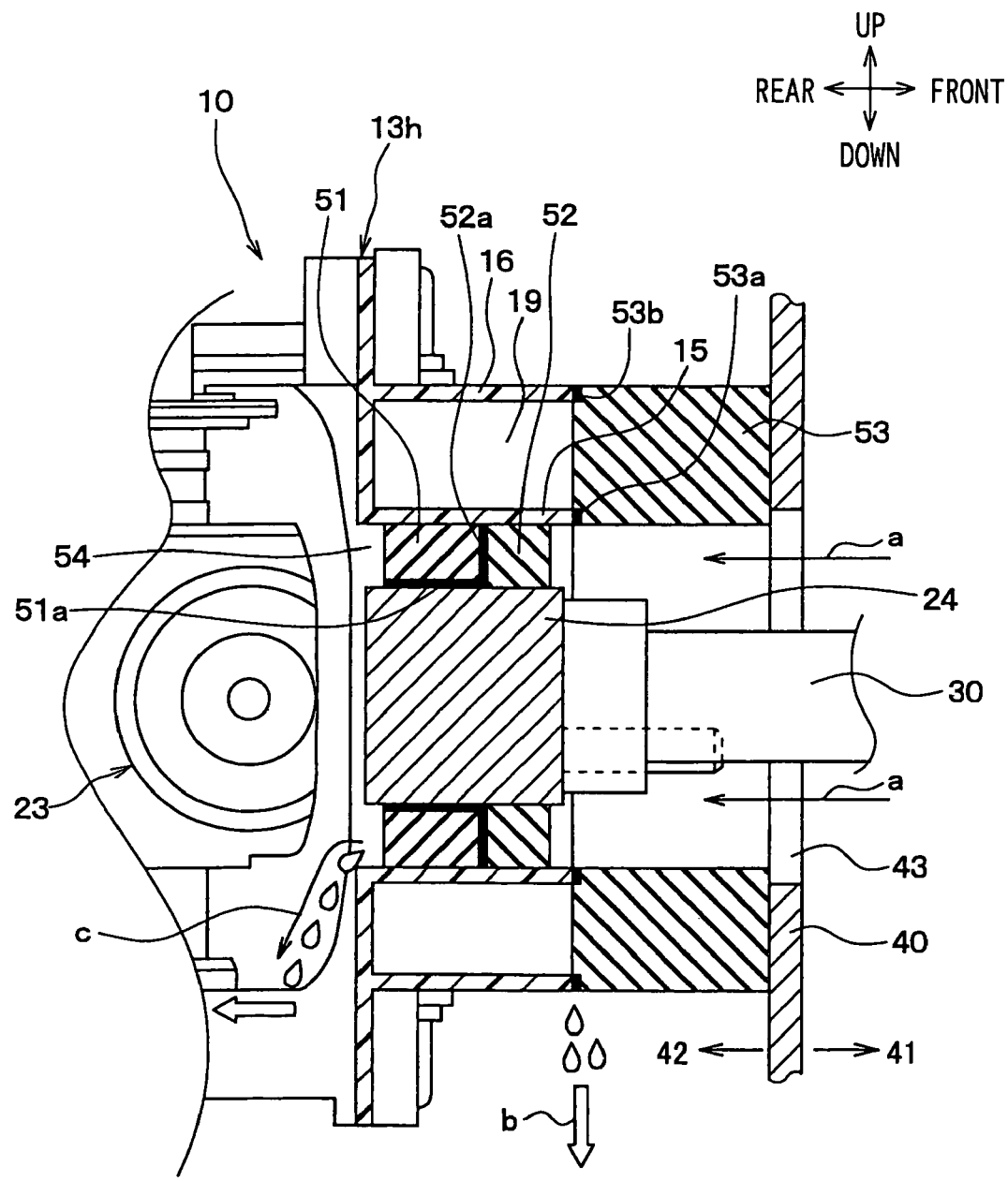
FIG. 8 is a cross-sectional view showing a seal structure for refrigerant pipes according to a related art and corresponding to a cross-sectional view taken along a line III-III in FIG. 2.

Thus, the bond area of the second packing unit 45 is substantially added, as compared with a related art shown in FIG. 8. Accordingly, the second packing unit 45 can be tightly bonded to the side of the walls 15 and 16, so that the gap between the second packing unit 45 and the walls 15, 16 is effectively sealed to restrict water from entering the passenger compartment 42 through the gap. In this embodiment, the front end surfaces of the ribs 17, 18 arranged between the walls 15, 16 are also fixedly bonded to the rear end surface of the second packing unit 45. Therefore, the bond area (bond intensity) of the second packing unit 45 can be further increased.

Moreover, the second packing unit 45 is made of the material with the high resilience capacity and the low watertightness capacity, and provided with the contact portion, which has the width L and is overlapped with the first packing unit 44. Thus, the rib 21 can powerfully push the second packing unit 45 against the isolation member 40 through the first packing unit 44, which contacts the second packing unit 45 at the contact portion with the width L. Therefore, the bearing stress between the second packing unit 45 and the isolation member 40 is increased. Accordingly, the gap between the second packing unit 45 and the isolation member 40 can be effectively sealed, so that water can be substantially restricted from entering the passenger compartment 42 through the gap.

On the other hand, the inner surface of the first packing unit 44 is fixedly bonded to the whole outer surface of the block joint 24, to have an enlarged bond area, as compared with a first packing unit 51 shown in FIG. 8 according to the related art. Moreover, the rear end of the first packing unit 44 is supported by the step portion 20a of the accommodation case 13h, thus preventing the bond portion 44a of the first packing unit 44 from being stripped by water entering from the pipe penetration opening 43 even if water violently hits the front end of the first packing unit 44. Accordingly, water can be effectively restricted from entering the inner side of the accommodation case 13h of the air conditioning unit 10.

Furthermore, the first packing unit 44 is made of the material with a large density to have the high watertightness capacity, thus substantially restricting water at the bond portion 44a from entering the passenger compartment 42.

According to this embodiment, the second packing unit 45 is bonded to the first packing unit 44 at the contact portion with the width L. Moreover, the front end of the first packing unit 44 is powerfully pushed against the rear end of the second packing unit 45 due to the rib 21. Therefore, even if the outer surface of the first packing unit 44 is arranged to have the clearance fit with the inner surface of the pipe coupling wall 15, the gap between the first packing unit 44 and the pipe coupling wall 15 can be effectively sealed so that water is restricted from entering the inner side of the accommodation case 13h through the gap.

In this embodiment, the air conditioning case 13 is divided into the three parts, that is, the lower case 13c, the left and right cases 13b, 13a. The left and right cases 13b, 13a are disposed at the upper side of the lower case 13c. The lower case 13c is not divided into right and left parts by a case division unit, considering a leakage of water into the passenger compartment 42 along the case division unit.

A water-entering experiment is performed for both the structure shown in FIG. 8 according to the related art and the air conditioning unit 10 having the seal structure according to the first embodiment. In this water-entering experiment, a sprayer is used for spraying water with a shower shape to the refrigerant passage connection parts of the two structures through the pipe penetration opening 43. Then, the amount of water entering the inner side of the accommodation case 13h and that leaked into the passenger compartment 42 are detected.

According to the experiment for the seal structure based on this embodiment, it is detected that both the amount of water leaked into the passenger compartment 42 and that entering the inner side of the accommodation case 13h are 0 cc. In contrast, the amount of water entering the inner side of the accommodation case 13h is up to 250 cc/30 min in the experiment for the seal structure according to the related art.

Thus, according to the first embodiment, water is effectively restricted from entering the inner side of the accommodation case 13h (lower case 13), so that water can be prevented from accumulating in the lower case 13. Then, a failure of the driving motor of the blow fan, which may be caused by an inflow of water accumulated in the lower case 13 into the driving motor along with cooling air, can be reduced.

Second Embodiment

In the above-described first embodiment, the ring-shape first packing unit 44 is wrapped around the block joint 24. The inner surface (inside portion) of the first packing unit 44 is bonded to the outer surface of the block joint 24. Referring to FIGS. 2 and 3, the first packing unit 44 is arranged at the vehicle rear side of the second packing unit 45, and the inside portion of the first packing unit 44 is disposed at the inner side of the ring-shape second packing unit 45 with respect to the vehicle front-rear direction. Thus, a part (lower side) of the butt portion 44b of the first packing unit 44 is exposed to the engine cabin 41 through the pipe penetration opening 43, as shown in FIG. 2. The two circumferential ends (butt portion 44b) of the first packing unit 44 are only butted against each other without being bonded, considering a cost reduction. If a mounting fault or a material deterioration of the first packing unit 44 is generated to cause a gap at the butt portion 44b, water may enter the inner side of the accommodation case 13h through the gap.

Figure 5A:
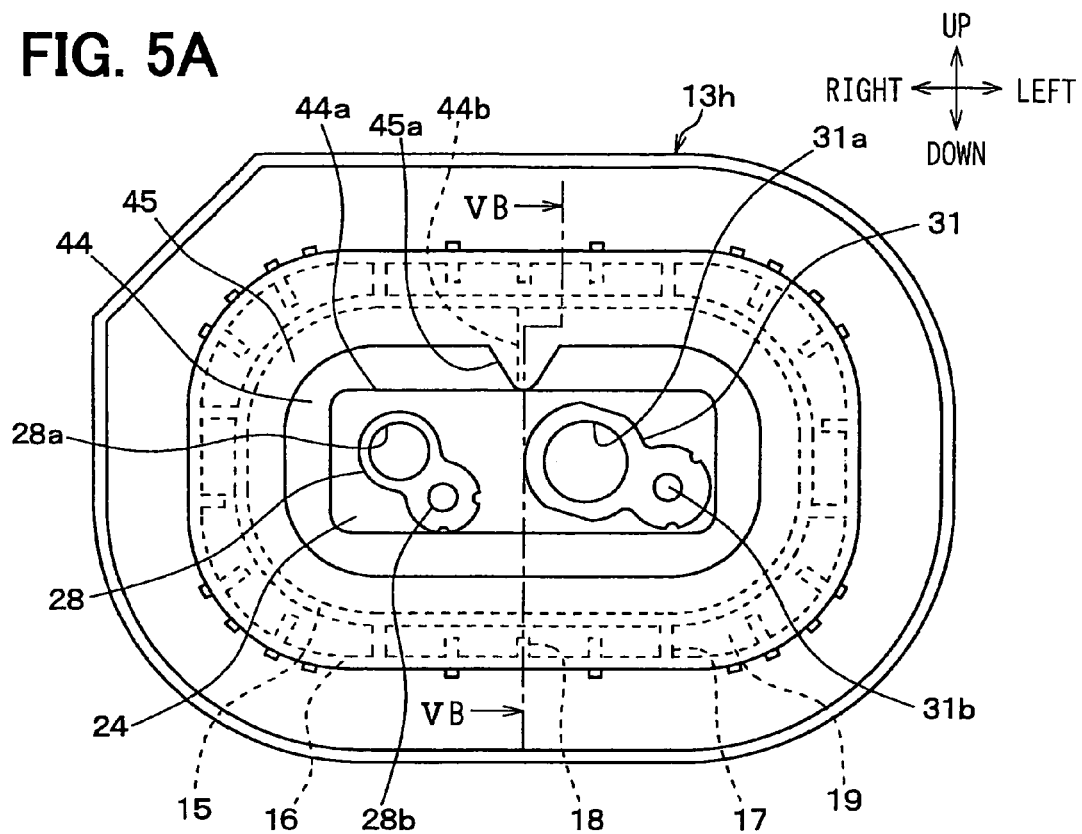
FIG. 5A is a front view showing an arrangement of packing units according to a second embodiment of the present invention and corresponding to a front view viewed in an arrow direction II in FIG. 1.
Figure 5B:
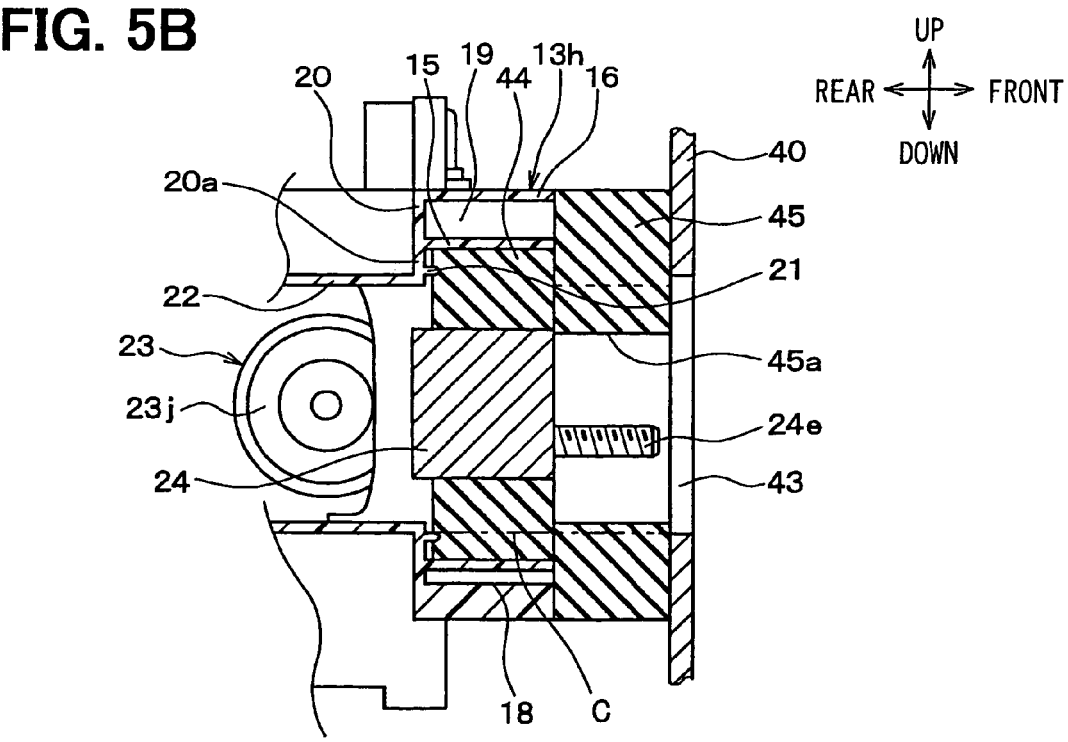
FIG. 5B is a cross-sectional view taken along a line VB-VB in FIG. 5A.
Figure 7:
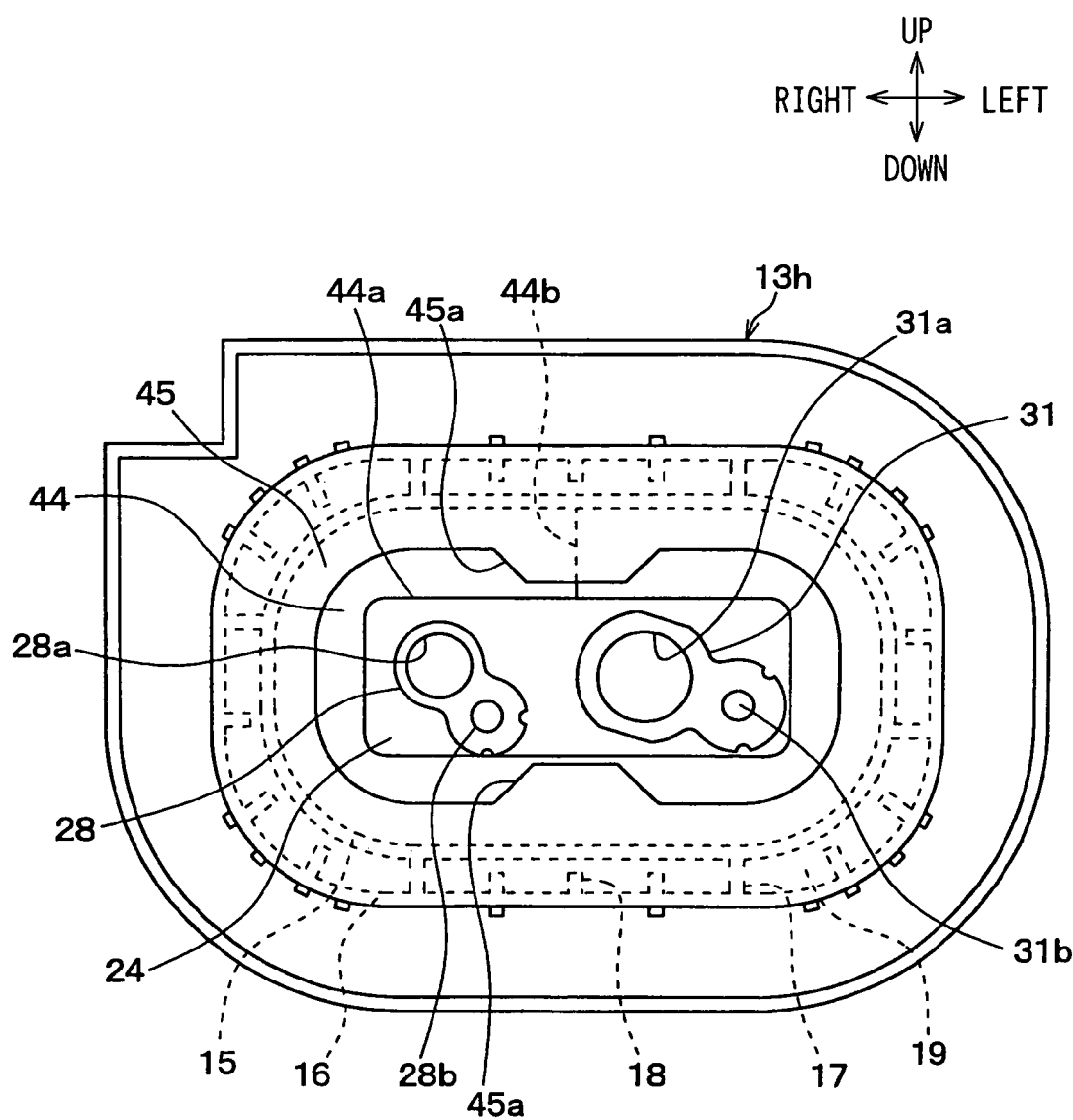
FIG. 7 is a front view showing an arrangement of packing units according to a fourth embodiment of the present invention and corresponding to a front view viewed in an arrow direction II in FIG. 1.

According to a second embodiment, referring to FIGS. 5A and 5B, a convex portion 45a protrudes from the inner surface of the second packing unit 45 at the position corresponding to that of the butt portion 44b with respect to the vehicle front-rear direction. The convex portion 45a has a triangular shape in the cross section perpendicular to the central axis direction of the second packing unit 45, to cover (overlap) the butt portion 44b in the vehicle front-rear direction.

Then, the butt portion 44b is not exposed to the engine cabin 41 through the pipe penetration opening 43. Accordingly, water entering from the pipe penetration opening 43 can be restricted from directly contacting the butt portion 44b and entering the passenger compartment 42.

As described in the first embodiment, the second packing unit 45 is formed by a stamping of a sheet-shape packing material to have an ellipse-ring shape. The convex portion 45a having the triangle shape can be formed by the ring-inside packing material which had been dumped, without increasing cost.

Because water entering from the pipe penetration opening 43 is easy to accumulate at the lower side of the first packing unit 44 (block joint 24) due to the self weight, the butt portion 44b of the first packing unit 44 is arranged on the upper side of the block joint 24.

Third Embodiment

According to a third embodiment of the present invention, referring to FIG. 6, the second packing unit 45 is provided with the two triangular-shape convex portions 45a, which protrude from the inner surface thereof at two symmetrical positions with respect to the vehicle left-right direction.

Accordingly, even if the mounting position of the second packing unit 45 is reversed in the vehicle up-down direction, one of the two convex portions 45a is to cover the butt portion 44b of the first packing unit 44, thus preventing a fault caused by a false mounting of the second packing unit 45.

Fourth Embodiment

According to a fourth embodiment, the second packing unit 45 is provided with the two trapezoid-shape convex portions 45 instead of the two triangular-shape convex portions 45 described in the above-described third embodiment.

As compared with the triangular-shape convex portion 45 in the third embodiment, the trapezoid-shape convex portion 45 has a larger width (in vehicle left-right direction) and a smaller height (in vehicle up-down direction) in the cross section perpendicular to the central axis of the second packing unit 45.

In this case, because the convex portion 45a has the larger width, the butt portion 44b can be substantially covered by the convex portion 45a, even if the position of the butt portion 44b deviates that of the convex portion 45a due to variations in dimensions or in mounting positions of the convex portion 45a and the butt portion 44b.

Moreover, according to this embodiment, the convex portion 45a has the smaller height, so that the low-pressure refrigerant pipe 30 can be readily attached or detached without being influenced by the convex portions 45.

Other Embodiment

Although the present invention has been fully described in connection with the preferred embodiments thereof with reference to the accompanying drawings, it is to be noted that various changes and modifications will become apparent to those skilled in the art.

The front end surface of the first packing unit 44 can be also arranged at the different plane from the front end surfaces of the walls 15, 16. For example, the first packing unit 44 can protrude to the vehicle front side with respect to the front end surfaces of the walls 15, 16. Contrarily, the first packing unit 44 can be also concaved to the vehicle rear side with respect to the front end surfaces of the walls 15, 16.

Moreover, in the above-described embodiments, the rib 21 is arranged at the whole step portion 20a in the circumferential direction thereof to have the annular shape. Because water entering from the pipe penetration opening 43 will flow downward due to the self weight, the rib 21 can be also formed only at the lower side of the step portion 20a not to be the annular shape.

Furthermore, in the above-described embodiments, the seal structure according to the present invention is suitably used for the refrigerant pipes 27 and 30. Similarly to the refrigerant pipes 27 and 30, the hot water pipes 14a, 14b extend to the side of the air conditioning unit 10 from the engine cabin 41 (outside passenger compartment 42) through a pipe penetration opening (not shown) of the isolation member 40. Therefore, the seal structure according to the present invention can be also used for the hot water pipes 14a, 14b.

Such changes and modifications are to be understood as being in the scope of the present invention as defined by the appended claims.

What is claimed is:

1. A seal structure in combination with an air conditioning unit mounted inside a passenger compartment, the air conditioning unit being connected with pipes which extend into the passenger compartment from an outside area through a pipe penetration opening of a dashboard separating an engine compartment from the passenger compartment, the seal structure comprising:
    a pipe-coupling opening wall defined by a case of the air conditioning unit, the pipe-coupling opening wall being arranged in an annular shape;
    a first packing unit arranged between an inner surface of the pipe-coupling opening wall and an outer surface of a connection unit of the pipes; and
    a second packing unit arranged between the dashboard and an end of the pipe-coupling opening wall facing the dashboard; wherein
    the second packing unit is bonded directly to both the first packing unit and the pipe-coupling opening wall; and
    a bonding surface between the second packing unit and the pipe-coupling opening wall is co-planar with a bonding surface between the second packing unit and the first packing unit.

2. The seal structure according to claim 1, wherein:
    the first packing unit is made of a material having a higher watertightness capacity than that of the second packing unit; and
    the second packing unit is made of a material having a higher resilience capacity than that of the first packing unit.

3. The seal structure according to claim 2, wherein a clearance is formed between an outer surface of the first packing unit and the inner surface of the pipe-coupling opening wall.

4. The seal structure according to claim 1, wherein the first packing unit has an end surface which is arranged at a same plane with an end surface of the pipe-coupling opening wall, the end surfaces of the first packing unit and the pipe-coupling opening wall being at a side of the second packing unit.

5. The seal structure according to claim 1, wherein:
    the pipes are refrigerant pipes of a refrigerant cycle; and
    the connection unit is a block joint which connect the refrigerant pipes to refrigerant passages of an expansion valve of the air conditioning unit.

6. The seal structure according to claim 1, wherein:
    the first packing unit and the second packing unit overlap each other in such a manner that an outer surface of the first packing unit is disposed at an outer side with respect to an inner surface of the second packing unit and the inner surface of the second packing unit is disposed at the outer side with respect to an inner surface of the first packing unit.

7. The seal structure according to claim 1, wherein the second packing unit contacts the dashboard.

8. A seal structure in combination with an air conditioning unit mounted inside a passenger compartment, the air conditioning unit being connected with pipes which extend into the passenger compartment from an outside area through a pipe penetration opening of an isolation member, the seal structure comprising:
    a pipe-coupling opening wall arranged at the air conditioning unit, the pipe-coupling opening wall being arranged in an annular shape;
    a first packing unit arranged between an inner surface of the pipe-coupling opening wall and an outer surface of a connection unit of the pipes;
    a second packing unit arranged between the isolation member and an end of the pipe-coupling opening wall facing the isolation member; and
    a step wall arranged at the air conditioning unit and disposed at an opposite end of the pipe-coupling opening wall with respect to the isolation member, the step wall protruding from the inner surface of the pipe-coupling opening wall to an inner side thereof, wherein
    the second packing unit is bonded directly to both the first packing unit and the pipe-coupling opening wall; and
    the first packing unit is supported by the step wall, and has an inner surface bonded to the outer surface of the connection unit.

9. The seal structure according to claim 8, wherein
    the step wall has a rib, which is arranged at least at a lower side of the step wall to push the first packing unit against the second packing unit and push the second packing unit against the isolation member through the first packing unit.

10. The seal structure according to claim 9, wherein the rib protrudes from the step wall to the side of the isolation member.

11. A seal structure in combination with an air conditioning unit mounted inside a passenger compartment the air conditioning unit being connected with pipes which extend into the passenger compartment from an outside area through a penetration opening of an isolation member, the seal structure comprising:
    a pipe-coupling opening wall arranged at the air conditioning unit, the pipe-coupling opening wall being arranged in an annular shape;
    a first packing unit arranged between an inner surface of the pipe-coupling opening wall and an outer surface of a connection unit of the pipes:
    a second packing unit arranged between the isolation member and an end of the pipe-coupling opening wall facing the isolation member; and
    an outer wall arranged at the air conditioning unit and disposed at an outer side of the pipe-coupling opening wall, the outer wall being separated from the pipe-coupling opening wall; and
    a plurality of ribs integrated with at least one of the pipe-coupling opening wall and the outer wall and protruding into a space between the pipe-coupling opening wall and the outer wall, wherein the second packing unit is bonded directly to both the first packing unit and the pipe-coupling opening wall; and the second packing unit is further bonded to an end of the outer wall and ends of the ribs.

12. A seal structure in combination with an air conditioning unit mounted inside a passenger compartment, the air conditioning unit being connected with pipes which extend into the passenger compartment from an outside area through a pipe penetration opening of an isolation member, the seal structure comprising:

a pipe-coupling opening wall arranged at the air conditioning unit, the pipe-coupling opening wall being arranged in an annular shape;

a first packing unit arranged between an inner surface of the pipe-coupling opening wall and an outer surface of a connection unit of the pipes; and a second packing unit arranged between the isolation member and an end of the pipe-coupling opening wall facing the isolation member, wherein the second packing unit is bonded to both the first packing unit and the pipe-coupling opening wall, wherein:

the inner surface of the first packing unit is disposed at an inner side with respect to an inner surface of the second packing unit, which is arranged along a rim portion of the pipe penetration opening of the isolation member;

the first packing unit has two circumferential ends, which butt against each other on the outer surface of connection unit of the pipes to construct a butt portion; and the second packing unit has at least a convex portion, which protrudes from the inner surface thereof at a position corresponding to that of the butt portion to cover the butt portion in a vehicle front-rear direction.

13. The seal structure according to claim 12, wherein the convex portion has a triangular shape in a cross section perpendicular to a central axis of the second packing unit.

14. The seal structure according to claim 12, wherein the convex portion has a trapezoid shape in a cross section perpendicular to a central axis of the second packing unit.

15. The seal structure according to claim 12, wherein the second packing unit has a plurality of the convex portions which are symmetrically positioned.

* * * * *